(12) United States Patent
Graeber et al.

(10) Patent No.: US 8,430,362 B2
(45) Date of Patent: Apr. 30, 2013

(54) AIRCRAFT HAVING A FORCE TRANSMISSION ELEMENT BETWEEN A CABIN STRUCTURAL ELEMENT AND A PRIMARY STRUCTURE

(75) Inventors: Ulrike Graeber, Hamburg (DE); Peter Grosse-Plankermann, Neu Wulmstorf (DE); Martin Pätz, Ratzeburg (DE); Holger Becker, Hamburg (DE)

(73) Assignee: Airbus Operations GmbH (DE)

( * ) Notice: Subject to any disclaimer, the term of this patent is extended or adjusted under 35 U.S.C. 154(b) by 353 days.

(21) Appl. No.: 12/936,714

(22) PCT Filed: Mar. 20, 2009

(86) PCT No.: PCT/EP2009/053301
§ 371 (c)(1),
(2), (4) Date: Nov. 23, 2010

(87) PCT Pub. No.: WO2009/124832
PCT Pub. Date: Oct. 15, 2009

(65) Prior Publication Data
US 2011/0133027 A1    Jun. 9, 2011

Related U.S. Application Data

(60) Provisional application No. 61/123,866, filed on Apr. 10, 2008.

(30) Foreign Application Priority Data

Apr. 10, 2008    (DE) .......................... 10 2008 018 249

(51) Int. Cl.
*G05D 1/12*    (2006.01)

(52) U.S. Cl.
USPC ........... 244/185; 244/118.5; 244/131; 29/428

(58) Field of Classification Search .................. 244/185, 244/120, 119, 118.5, 125, 17.27, 17.11, 117 R, 244/129.1; 29/428, 897.32, 527.3; 52/144, 52/460; 188/379, 380; 248/550–559; 267/140.11, 267/136
See application file for complete search history.

(56) References Cited

U.S. PATENT DOCUMENTS

| 2,095,626 A | 10/1937 | Bassett |
| 3,416,274 A | 12/1968 | Webb |

(Continued)

FOREIGN PATENT DOCUMENTS

| DE | 3881539 T2 | 11/1993 |
| DE | 19639915 A1 | 6/1998 |

(Continued)

*Primary Examiner* — Christopher P Ellis
*Assistant Examiner* — Medhat Badawi
(74) *Attorney, Agent, or Firm* — Lerner, David, Littenberg, Krumholz & Mentlik, LLP

(57) ABSTRACT

The invention relates to an aircraft comprising a force transmission element which detachably connects a cabin structural segment to an aircraft primary structure and which comprises a cabin bearing element and a structure bearing element, the cabin bearing element being connected to the cabin structural segment and the structure bearing element being connected to the aircraft primary structure. The force transmission element is designed in such a manner that a force transmission can take place between the cabin structural segment and the aircraft primary structure with at least one degree of freedom of movement.

16 Claims, 18 Drawing Sheets

U.S. PATENT DOCUMENTS

| | | |
|---|---|---|
| 4,050,208 A | 9/1977 | Pompei et al. |
| 4,799,631 A * | 1/1989 | Humphries et al. ....... 244/118.5 |
| 5,201,831 A | 4/1993 | Higgins et al. |
| 5,687,929 A * | 11/1997 | Hart et al. ................. 244/118.1 |
| 6,158,690 A * | 12/2000 | Wadey et al. ............. 244/17.27 |
| 6,536,710 B1 * | 3/2003 | Bobzien et al. ............... 244/119 |
| 6,848,654 B1 * | 2/2005 | Mills et al. ................. 244/118.5 |
| 2003/0042363 A1 | 3/2003 | Dussac et al. |
| 2005/0044712 A1 | 3/2005 | Gideon et al. |
| 2005/0082430 A1 * | 4/2005 | Young et al. ................. 244/119 |
| 2005/0236523 A1 | 10/2005 | Schwartz et al. |
| 2006/0102786 A1 * | 5/2006 | Granzeier et al. ............. 244/119 |
| 2009/0250554 A1 * | 10/2009 | Graeber et al. ............... 244/120 |
| 2012/0145828 A1 * | 6/2012 | Grosse-Plankermann et al. ........................ 244/118.5 |

FOREIGN PATENT DOCUMENTS

| | | |
|---|---|---|
| DE | 10339508 A1 | 3/2005 |
| DE | 102005023886 A1 | 12/2006 |
| DE | 102006048376 A1 | 4/2008 |
| EP | 0279620 A2 | 8/1988 |
| EP | 0437870 A1 | 7/1991 |
| GB | 2287517 | 9/1995 |
| GB | 2317825 | 4/1998 |
| JP | 56047400 A | 4/1981 |
| JP | 57004455 A | 1/1982 |
| JP | 2000142585 A | 5/2000 |
| JP | 2001171515 A | 6/2001 |
| JP | 2005112354 A | 4/2005 |
| JP | 2005125998 A | 5/2005 |
| JP | 2006306388 A | 11/2006 |
| JP | 2008516415 A | 5/2008 |
| JP | 2008543651 A | 12/2008 |
| RU | 2191716 C2 | 10/2002 |

* cited by examiner

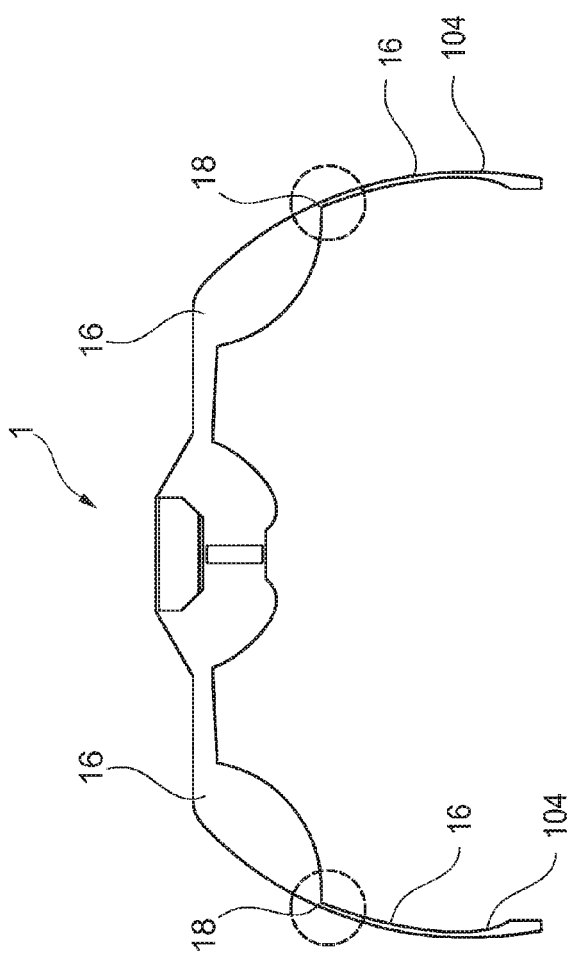
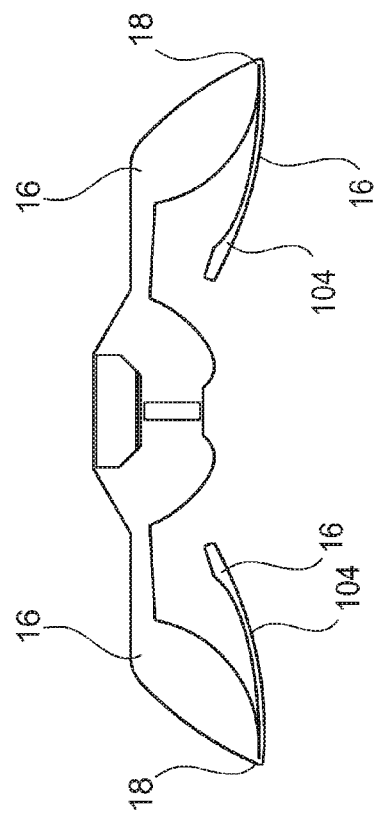

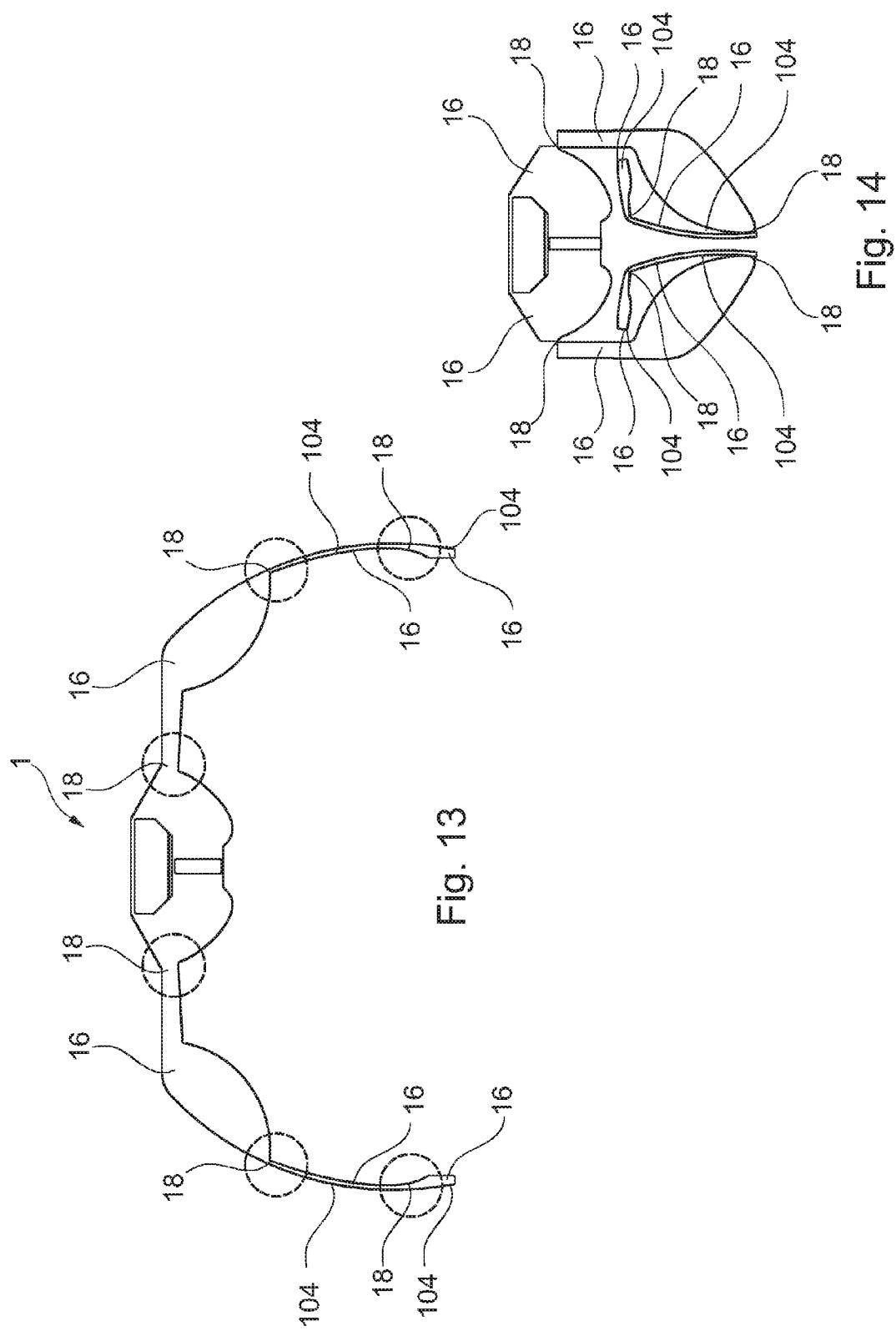

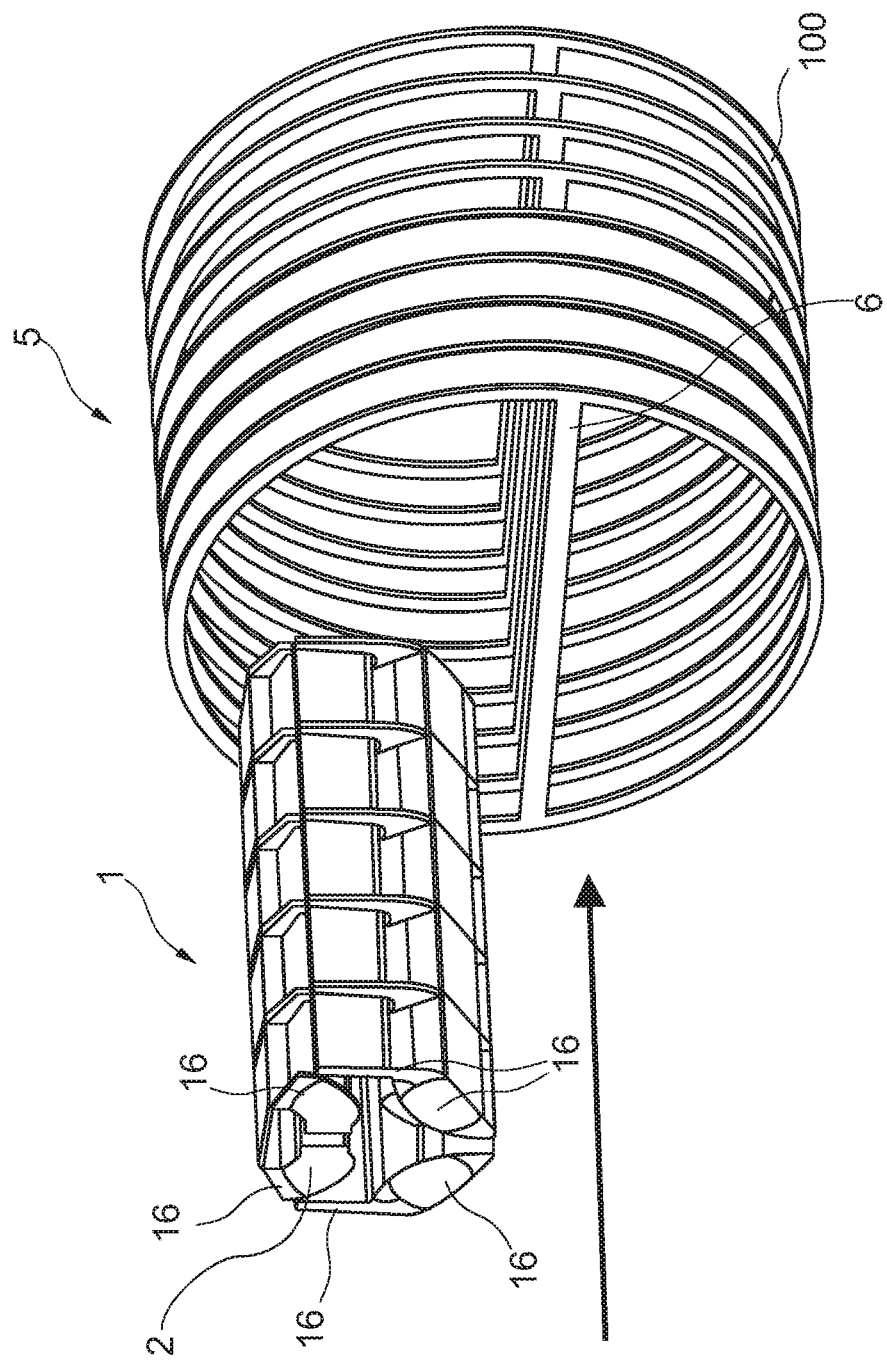

AIRCRAFT HAVING A FORCE TRANSMISSION ELEMENT BETWEEN A CABIN STRUCTURAL ELEMENT AND A PRIMARY STRUCTURE

CROSS-REFERENCE TO RELATED APPLICATIONS

This application is a national phase entry under 35 U.S.C. §371 of International Application No. PCT/EP2009/053301, filed Mar. 20, 2009, published in German, which claims the benefit of the filing date of U.S. Provisional Patent Application No. 61/123,866, filed Apr. 10, 2008, and of German Patent Application No. 10 2008 018 249.4, filed Apr. 10, 2008, the entire disclosures of which applications are hereby incorporated herein by reference.

FIELD OF THE INVENTION

The present invention pertains to an aircraft with a force transmitting element that separably connects a cabin element to a primary aircraft structure and to an aircraft with a sealing element for a cabin module.

BACKGROUND OF THE INVENTION

In today's commercial aircraft, cabin fixture elements that form an interior cabin such as, for example, luggage compartments, paneling sections or other interior structural elements are directly mounted on the primary aircraft structure such as, for example, frames, stringers or other supporting elements of the aircraft fuselage. The primary aircraft structure is continuously subjected to deformations due to various structural stresses caused, for example, by the pressurization of the aircraft interior that leads to swelling of the fuselage at high altitudes, thermal stresses that may be the result of expansions caused by a temperature difference of up to 100° C. or stresses that are related to flight mechanics, particularly during the takeoff and landing phase, and lead, for example, to a distortion of the aircraft in its longitudinal axis. This deformation of the primary aircraft structure inevitably leads to a change in the position of the cabin fixture elements relative to one another. In order to ensure that the individual cabin fixture elements do not damage one another during this constant deformation of the primary aircraft structure, sufficiently wide gaps are provided between the individual cabin fixture elements and these gaps need to be elaborately sealed for aesthetic reasons, as well as noise and temperature reasons.

DE 10 2006 048 376.6, the applicant of which is also the applicant of the present application, describes how cabin structure segments such as, for example, ceiling elements or lateral (i.e. side) sections that may be fitted with cabin fixture elements such as luggage compartments can be prefabricated in the form of a cabin structure unit. In order to form a passenger cabin, several cabin structure units are arranged behind one another and interconnected. The cabin structure unit is realized in a self-supporting fashion and has a shape similar to that of half a barrel without bottom. The side walls of such a self-supporting cabin structure unit are anchored to the aircraft floor structure.

It was now determined that the cabin structure units may move relative to one another and relative to the primary aircraft structure, for example, due to stresses resulting from flight maneuvers, and that the own weight, as well as the possible load in the luggage compartments, leads to bulging of the cabin structure segments of the cabin structure unit, namely of the two side walls.

SUMMARY OF THE INVENTION

The invention is based on the first objective of disclosing a device that effectively supports a cabin structure unit. The invention furthermore is based on the second objective of disclosing a device that prevents individual cabin structure units from damaging one another.

The first objective is attained with an aircraft with a force transmitting element that separably connects a cabin structure segment to a primary aircraft structure and features a cabin bearing element, as well as a structure bearing element, wherein the cabin bearing element is connected to the cabin structure segment and the structure bearing element is connected to the primary aircraft structure. According to the invention, the force transmitting element is designed in such a way that a force transmission between the cabin structure segment and the primary aircraft structure can take place with at least one degree of freedom of motion. Consequently, the force transmitting element is able to transmit a force in no more than two translatory directions. The transmission of a force in a third translatory direction is not possible. When the cabin structure segments, particularly the side walls, of a cabin structure unit mounted in an aircraft bulge due to their own weight and the load in the luggage compartments, they can only deform until the side of the side wall that faces the primary aircraft structure abuts on the frames of the primary aircraft structure. The force transmitting element makes it possible to purposefully introduce a force into the frames and stringers of the primary aircraft structure via the side walls of the cabin structure unit. The frames and stringers therefore are only subjected to the forces, for which they are designed, namely lateral and longitudinal forces.

Takeoffs or landings cause acceleration forces to be exerted upon the cabin structure segment along the longitudinal axis of the aircraft. The force transmitting element makes it possible to introduce part of the acceleration forces into the primary aircraft structure via the side walls of the cabin structure unit. Consequently, the floor structure does not have to absorb all occurring acceleration forces, as well as the torques resulting thereof. The torques occur because the acceleration forces engage over the entire height of the cabin structure unit and therefore form a lever arm referred to the floor structure. The position of the force transmitting element can be chosen such that the torques are minimized.

In one advantageous embodiment, the primary aircraft structure features frames and stringers that are designed for absorbing forces in one direction only. The force transmitting element is arranged on the frames and/or stringers and transmits forces in this direction only. Frames are designed for absorbing forces acting thereupon in the radial direction only. Forces that act transverse to the frames, for example forces along the longitudinal axis of the aircraft, may cause the frames to buckle and thusly severely weaken the primary structure. This applies analogously to the stringers. They are designed for absorbing forces that occur along the longitudinal aircraft axis. If transverse forces such as, for example weight forces are introduced into a stringer, it may buckle and also severely weaken the primary structure. Since the force transmitting element advantageously transmits forces in one translatory direction only, it is possible to respectively subject the stringer and the frame to exactly the force that the stringer or the frame is respectively designed to absorb. Consequently, only forces that occur along the longitudinal aircraft axis are introduced into the stringer. Accordingly, only forces that act perpendicular to the frame are introduced into the frame.

In another advantageous embodiment of the invention, a friction-reducing insert is situated between the structure bearing element and the cabin bearing element. This insert can prevent frictional forces that act transverse to the direction, in which a force can be respectively introduced into the frames and stringers, from reaching a magnitude that can have damaging effects on the primary aircraft structure. Frictional forces can be created if a relative motion between the aircraft structure and the cabin fixture element or, more specifically, between the structure bearing element and the cabin bearing element occurs during the operation of the aircraft. Plastics such as PTFE or PVDF may be used as inserts. The insert naturally may also be realized in the form of a coating. If the frame consists of aluminum and is realized in the form of a Z-frame, in particular, it would be possible to coat the limb that may form a structure bearing element. One suitable process in this respect involves, for example, hard-anodizing of this limb. This coating already has a significant friction-reducing effect. However, this layer may also be provided with PTFE in order to additionally reduce the friction.

This insert also makes it possible to reduce or prevent a noise that could possibly result from the relative motion between the cabin bearing element and the structure bearing element.

A spring damping element may be advantageously arranged between the structure bearing element and the cabin bearing element. During the operation of the aircraft, not only relative motions between the cabin structure unit and the aircraft structure may occur, but also oscillations that are caused, for example, by the engines. If these oscillations or vibrations are directly transmitted from the aircraft structure to the cabin structure unit and the cabin structure unit has insufficient internal damping, these oscillations may lead to a background noise in the passenger cabin. In addition, the vibrations of the aircraft structure would also lead to vibrations of the cabin structure unit. Both influences, namely the background noise and the vibrations, contradict the aspirations of airlines to make the stay aboard the aircraft as comfortable as possible for the passengers. The spring damping element reduces these negative influences. The characteristics of the spring and of the damper naturally need to be adapted such that no resonances can occur between the cabin structure unit and the aircraft structure. Such a spring damping element also makes it possible to dampen transverse forces, the cause and harmful effect of which on the primary structure were already explained above, to at least a harmless level. In addition, a uniform surface pressure between the cabin bearing element and the structure bearing element can be achieved with such a spring damping element. Locally occurring punctual load peaks that otherwise could result in damages to the cabin structure unit, the frame and/or the stringer can be avoided in this fashion. Such a spring damping element is furthermore suitable for compensating manufacturing tolerances. The spring damping element naturally may also be used for at least largely preventing a heat transfer due to the contact between the cabin structure unit and the aircraft structure.

It is preferred that the spring damping element is either rigidly connected to the cabin bearing element or the structure bearing element. Due to this mounting, the spring damping element is prevented from leaving its assigned location, i.e., from "migrating," during relative motions between the cabin structure unit and the aircraft structure. This mounting also provides the option of sectionally arranging the spring damping element at predetermined positions only. The size of the sections needs to be chosen in accordance with the occurring loads. It would naturally also be possible to continuously arrange a spring damping element, for example, in the form of an elastomer over the entire height or length of the cabin structure unit or the aircraft structure.

Since the spring damping element is only connected to one of the components, i.e., either to the cabin structure unit or to the aircraft structure, the spring damping element is only subjected to compressive stresses, but not to tensile stresses. This opens up a broad selection of spring damping elements because there are certain types, for example, of elastomers that are destroyed under tensile stresses.

A one-sided mounting also makes it possible for the cabin structure unit to completely separate from the frames and stringers, i.e., for these components to no longer contact one another.

In another advantageous embodiment of the invention, the cabin structure unit respectively features, referred to the longitudinal direction of the aircraft, one right and one left side wall with an upper end and a lower end, between which the cabin bearing element extends in an at least partially continuous fashion and is rigidly connected to the side wall. It is practical to mount the spring damping element on the side wall, in particular, if the side wall is braced against the frame. The cabin bearing element therefore may be designed in such a way that it automatically fixes the spring damping element. Since the side walls are sensitive to bulging, a continuous cabin bearing element that is rigidly connected to the side wall may simultaneously serve as a reinforcement.

In another advantageous embodiment of the invention, the lower end of the side wall is spaced apart from the primary aircraft structure by a greater distance than the upper end and the cabin bearing element is realized such that the distance of the cabin bearing element from the structure bearing element is essentially constant. Since the cabin bearing element is designed in such a way that the distance between the cabin bearing element and the frame is constant, it is possible to use identical spring damping elements. On the rear side of the side wall, the cabin bearing element consequently has a greater height at the lower bearing point than at the upper bearing point.

A stabilizing rib advantageously is integrally moulded onto the cabin bearing element. As a rule, the side walls are manufactured of fiber-reinforced plastic. In this case, the shape produced approximately corresponds to that of a tube segment. When a force is introduced accordingly, these curved walls only have a low resistance to bulging that may be reduced further by openings, e.g., for windows. For example, if weight forces act upon the side walls of the self-supporting cabin structure unit, the side walls have a tendency to bulge. If the cabin bearing elements extend continuously from the upper to the lower end, it is particularly advantageous to design these cabin bearing elements in a U-shaped fashion such that the limbs extend perpendicularly on the side wall, enormously increase the resistance to bulging in this way and thusly stabilize the side wall.

In one advantageous embodiment of the invention, the cabin bearing element is realized in the form of a brace with an extension that is rigidly connected to a sliding element. This extension engages into a U-shaped structure bearing element that is rigidly connected to the stringer. The structure bearing element may be provided with a likewise U-shaped spring damping element that preferably consists of an elastomer.

The structure bearing element is arranged such that only forces acting in the longitudinal axis of the aircraft can be introduced into the stringer. The limbs of the U-shaped structure bearing element encompass the extension such that forces acting in and opposite to the direction of flight can be transmitted. It would also be possible to provide one brace with several extensions so as to realize a better force distribution and therefore a lower load per extension.

In order to ensure that the respective extensions can be easily inserted into the U-shaped structure bearing element or the spring damping element during the installation, the structure bearing element, the spring damping element and/or the extension may be provided with an insertion bevel, on which the two components to be engaged can slide during the installation until they reach their final position. A certain self-positioning of the components can be achieved during the installation in this way.

In another advantageous embodiment of the invention, the sliding element is adjustably arranged in a rail that is rigidly connected to the cabin structure segment. The cabin structure unit needs to be aligned relative to the aircraft structure in the longitudinal direction of the aircraft due to manufacturing tolerances. Since an adjustment option is provided, the individual cabin structures segments can be realized such that the joints between the individual cabin structure segments have the same width. When the cabin structure unit is unfolded in the aircraft fuselage, it is still possible to access the sliding element situated on the side of the cabin structure segment that faces the aircraft structure through the window openings. In order to achieve a smooth adjustability of the sliding element, a friction-reducing insert may be placed between the sliding element and the rail. The adjustment itself may be realized, for example, with a screw that engages on a front side of the sliding element. The adjustment may also be realized with a snap lock. This snap lock engages once the correct position is reached. The adjustment to be carried out manually is automated in this fashion.

In another advantageous embodiment of the invention, the rail is arranged in the direction, in which the force transmitting element can transmit a force. Due to this arrangement of the rail, all forces engaging on the rail on the longitudinal axis of the aircraft can be introduced into the stringer. Consequently, force components that otherwise would have to be introduced into the frame are prevented due to the position of the rail, namely parallel to the stringer.

The second objective is attained with an aircraft with a sealing element for a cabin structure unit featuring at least two cabin structure segments that are spaced apart from one another by a gap, wherein the gap is at least partially closed with an elastic sealing element. According to the invention, the sealing element is realized in the form of a hollow chamber defined by a pair of opposite longitudinal walls that bridge the gap and a pair of opposite lateral walls that abut on the cabin structure segments, wherein the pair of longitudinal walls buckles toward one another in accordance with a predetermined spring constant when the gap becomes smaller, and wherein the spring constant changes when the pair of longitudinal walls contact one another.

Due to this design, relative motions between the individual cabin structure segments that are successively arranged, for example, in the longitudinal axis of the aircraft as they may occur, for example, during takeoffs and landings can be dampened until the longitudinal walls of the sealing element contact one another. Such a sealing element may be arranged within a cabin structure unit, i.e., between the individual adjacent cabin structure segments that form a cabin structure unit, as well as between two adjacent cabin structure units. Consequently, the sealing element can be arranged longitudinally referred to the longitudinal axis of the aircraft, as well as transverse thereto. Such a sealing element naturally may also extend between the floor structure and the lateral section mounted thereon. Until the longitudinal walls contact one another, no forces or only low forces are respectively transmitted to the adjacent cabin structure segment or the adjacent cabin structure unit. Unless both longitudinal walls of the sealing element contact one another and the cabin structure segments and/or cabin structure units continue to move toward one another, the force created during this process cannot be introduced into the adjacent cabin structure segment and/or the adjacent cabin structure unit. The spring characteristic of the sealing element plotted in the form of a force-path diagram therefore may feature a sharp bend or progress unsteadily. This realization of the sealing element consequently provides the advantage that the individual cabin structure segments cannot contact one another or the adjacent cabin structure unit due to the occurring relative motions, and that the occurring forces even can be purposefully introduced into the adjacent cabin structure segment once a critical point is reached.

One longitudinal wall of the sealing element may furthermore be designed in a colored fashion. For example, the longitudinal wall that is visible to the passengers may be adapted to the interior of the cabin with respect to its colors. It would naturally also be possible that the longitudinal wall of the sealing element facing the passenger compartment does not extend flush with the cabin structure segment, but the sealing element rather is set back relative to the cabin structure segment. This would result in a shadow joint.

In one advantageous embodiment of the invention, a medium is enclosed in the hollow chamber of the sealing element. This medium may be gaseous, liquid or even solid. However, the medium needs to have a certain compressibility. The incorporation of the medium makes it possible to influence of the spring characteristic of the sealing element. The medium should also have adequate noise-insulating properties such that wind and engine noises are largely unable to reach the passenger cabin. In addition, the medium should provide adequate thermal insulation such that the extremely cold temperatures prevailing at high altitudes cannot be transferred into the passenger cabin via this sealing element. When using a liquid or gaseous medium, the hollow chamber would have to be sealed in a fluid-tight or gas-tight fashion on both of its ends. This can be realized, for example, by means of vulcanizing, welding or bonding.

In another advantageous embodiment of the invention, the lateral wall of the sealing element features a spring that engages into a groove provided in the cabin structure segment such that the position of the lateral wall is fixed relative to the cabin structure segment. Consequently, the lateral walls remain in contact with the cabin structure segments when the individual cabin structure segments shift relative to one another transverse to the longitudinal axis of the aircraft and, for example, create an offset between the individual cabin structure segments during this process. Due to the stationary arrangement of the lateral wall relative to the cabin structure segment, no gap can form between the lateral wall of the sealing element and the cabin structure segment. Cold temperatures and noises could reach the passenger cabin through these gaps and therefore significantly impair the physical comfort of the passengers in the passenger cabin.

According to another aspect of the present invention, a cabin structure unit is proposed for mounting cabin fixture elements in an aircraft, particularly an aircraft of the type described above or in DE 10 2006 048 376.6, wherein the cabin structure unit is designed in such a way that a cabin fixture element can be installed, wherein the cabin structure unit is realized in a self-supporting fashion, wherein the cabin structure unit can be mounted on an aircraft structure, wherein the cabin structure unit features cabin structure segments, and wherein the cabin structure segments are connected to one another in a collapsible fashion by means of hinges.

Each cabin structure unit may be divided into a number of segments. The segments may consist of longitudinally extending stiffening ribs, stiffening screens, air ducts or another segment that provides suitable static properties for use as a cabin structure unit. All of the cabin structure segments may form the cabin structure unit, for example, in the circumferential direction.

Since the cabin structure unit and, in particular, the structure segments are connected by means of hinges, the volume of the entire unit can be reduced such that the installation of the unit may be simplified. The cabin structure unit may be transported into the installation position in a collapsed state and unfolded into its functional shape at this location. It is also possible to prefabricate the cabin structure unit with its cabin fixture elements outside the aircraft fuselage and to subsequently transport the prefabricated and collapsed cabin structure unit to the installation position in the aircraft fuselage. The hinge is arranged in such a way that the axis, about which the at least one cabin structure segment of a cabin structure unit can be pivoted, extends essentially parallel to the longitudinal axis of the aircraft. The prefabricated and collapsed cabin structure unit can be transported through small openings such as aircraft doors such that it is also easier to change the cabin layout when the fuselage is assembled. In addition, fewer assemblers may be required within the aircraft fuselage at the same time if the cabin structure unit is prefabricated outside the aircraft such that the impairments between the assemblers caused by the small installation space in the fuselage can be reduced. In this way, the assembly of the cabin structure unit, as well as the entire assembly of the aircraft, can be accelerated and realized in a less complicated fashion.

According to another exemplary embodiment, the cabin structure unit furthermore features adaptation elements. The adaptation elements are designed in such a way that they connect the cabin fixture elements to the aircraft structure or to the floor structure.

In order to connect the cabin fixture elements to the aircraft structure, it would be possible to provide, for example, several standardized connecting elements so as to reduce the complexity and the time required for the installation process. If the cabin fixture element consists, for example, of a window, the window needs to be connected to the opening in the aircraft structure. In this case, it is necessary to provide an adaptation element that seals the inner wall of the aircraft relative to the cabin fixture element. The adaptation element may consist of a simple plug and snap connection that features a window sealing elements, etc. The adaptation element may also provide compensation properties in order to compensate relative motions between the cabin structure unit and the fuselage structure that result, for example, from different temperature or pressure levels. The adaptation element may also be selected from the group consisting of electric connecting elements, air duct connecting elements or data link connecting elements.

According to another exemplary embodiment, the cabin structure unit is designed in such a way that it supports the aircraft structure. As already mentioned above, the cabin structure unit is self-supporting such that the cabin structure unit can carry its own weight. In addition, the cabin structure unit may be designed in such a way that it dampens forces and torques that originate, for example, from the fuselage structure. This is the reason why the aircraft structure can be realized with less weight such that the overall weight of the aircraft can also be reduced. The cabin structure unit therefore may have static properties in order to support the aircraft structure.

According to another aspect of the invention, a method is proposed for assembling a cabin structure unit for an aircraft of the type described in DE 10 2006 048 376.6. The cabin structure unit is prefabricated outside an aircraft structure. The prefabricated cabin structure unit is transported into the aircraft structure through an opening thereof. The prefabricated cabin structure unit is furthermore placed at a predetermined position in the aircraft structure. The prefabricated cabin structure unit is mounted on the aircraft structure at the predetermined position.

If this installation method is used, it is possible to prefabricate the cabin structure unit outside the aircraft such that the assembly processes for the aircraft can be carried out separately and simultaneously. In this way, it is possible, for example, to install the insulation of the aircraft structure while the cabin structure unit can be simultaneously fabricated outside the aircraft. In a next step, the complete cabin structure unit can be transported into the aircraft fuselage through the open fuselage sections and then installed in the aircraft structure at a predetermined position. The logistic complexity can be reduced in this fashion because all equipment parts such as cabin fixture elements can be stored and fabricated outside the aircraft fuselage. The number of assemblers who simultaneously work in the fuselage can also be reduced because the assemblers of the cabin structure unit can assemble the cabin outside the aircraft fuselage. Consequently, the assembly sequences can also be realized more economically becomes more space may be available for the assemblers. In this way, the assembly sequences for the fuselage, the cabin and the entire aircraft can be carried out faster and in a more relaxed fashion.

According to the exemplary embodiment of the method, the prefabricated cabin structure unit is realized in a collapsible fashion. In this way, the prefabricated cabin structure unit can be collapsed before it is transported through the opening of the aircraft structure. The prefabricated cabin structure unit is unfolded at the predetermined position in the aircraft structure.

Due to the ability to collapse the cabin structure units or the prefabricated cabin structure units, respectively, it is possible to provide small openings in the aircraft fuselage in order to transport the cabin structure unit to the predetermined mounting points in the fuselage. The cabin structure unit can be unfolded in the aircraft fuselage and mounted at the predetermined position. In this way, smaller openings such as doors make it possible to transport the collapsed, prefabricated cabin structure unit into the fuselage. This furthermore makes it possible to install cabin structure units in a disassembled state, namely also after the aircraft is completely assembled or work on the fuselage is completed, respectively. If it is preferred, for example, that passenger aircraft have flexible cabin layouts, it is possible to quickly change the cabin layout by collapsing the cabin structure units, removing the cabin structure units from the aircraft fuselage through the door and installing a different type of cabin structure unit.

According to another exemplary embodiment of the method, the cabin fixture element is installed into the prefabricated cabin structure unit outside the aircraft structure. In this way, the cabin fixture elements can be mounted on the cabin structure unit that, in turn, can be simultaneously mounted on the aircraft structure. The overall production time can be reduced.

According to another exemplary embodiment of the method, the opening of the aircraft structure is selected from the group consisting of fuselage doors, openings of fuselage segments and hatchways.

According to another exemplary embodiment of the method, the cabin structure unit features cabin structure segments, wherein the cabin structure segments are connected to one another in a collapsible fashion by means of hinges. The cabin structure unit may also be divided into cabin structure segments that are connected to one another by means of hinges such that several options can be provided for collapsing a cabin structure unit. In this way, a very small volume of a collapsed and prefabricated cabin structure unit can be realized such that even the smallest openings in the fuselage structure can be used for transporting this cabin structure unit to the intended installation site within the fuselage.

Other details and advantages of the invention result from the dependent claims in connection with the description of exemplary embodiments that are elucidated below with reference to the drawings.

BRIEF DESCRIPTION OF THE DRAWINGS

FIGS. 11 to 14 show exemplary illustrations of collapsible cabin structure units according to one exemplary embodiment of the present invention;

FIGS. 15 to 17 show schematic representations of a method for installing a cabin structure unit according to one exemplary embodiment of the present invention;

DETAILED DESCRIPTION OF EXEMPLARY EMBODIMENTS

Identical or similar components in the different figures are identified by the same reference symbols. The figures show schematic representations that are not true-to-scale.

Figure 1:
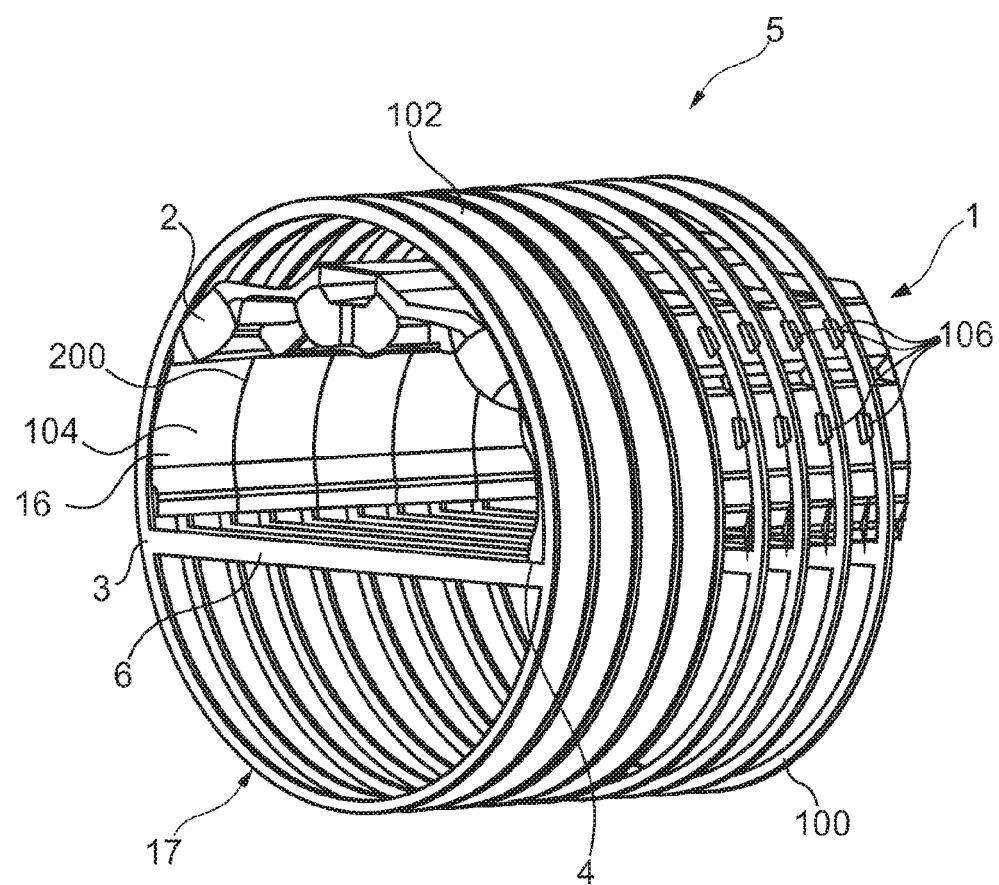
FIG. 1 shows a perspective representation of several cabin structure units in an aircraft fuselage.

FIG. 1 shows a cabin section in a primary aircraft structure 5 that is composed of several cabin structure units 1. The primary aircraft structure 5 consists of frames 100, a floor structure 6 and an aircraft skin 102. The longitudinal braces or stringers are not shown in this figure in order to provide a better overview. The individual cabin structure units 1 are separated from one another by sealing elements 200. A cabin structure unit 1 is composed of several cabin structure segments 16, the bottom two of which are referred to as lateral sections 104. The lateral sections 104 are connected to a movable bearing 3 on one side and to a fixed bearing 4 on the opposite side. The two bearings 3, 4 in turn are rigidly connected to the floor structure 6. Cabin fixture elements 2 in the form of luggage bins are mounted on the cabin structure segments 16 that form the ceiling of the cabin structure unit 1. Force transmitting elements 106 are mounted between the frames 100 and the lateral sections 16 and introduce the forces generated by the cabin structure units 1 into the frames 100.

Figure 2:
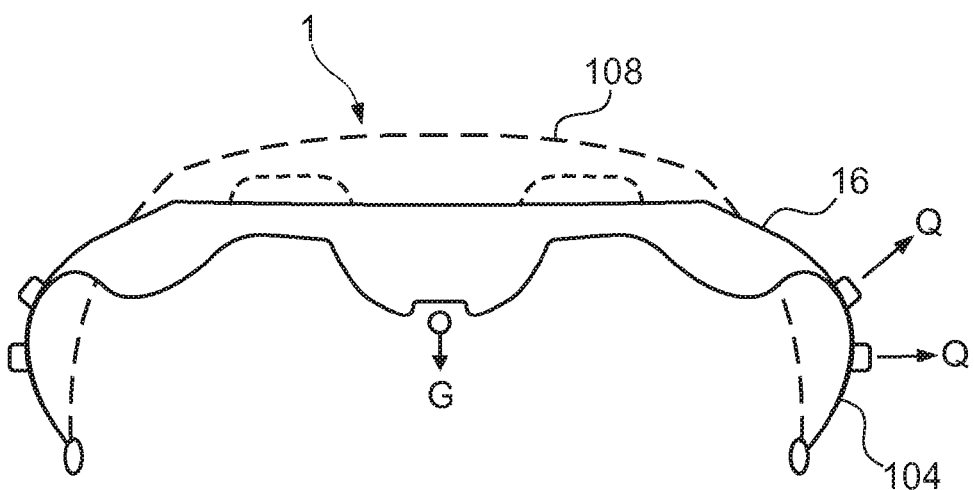
FIG. 2 shows a cross section through a cabin structure unit under a weight load.

FIG. 2 shows a cross section through a cabin structure unit 1. One can clearly see how the original shape 108 of the cabin structure unit 1 illustrated in the form of a broken line deforms under the force G that originates at the center of gravity of the cabin illustrated in the form of a dot and acts upon the cabin structure unit 1 in the direction of the arrow. The force G is composed of the own weight of the cabin structure unit 1 that may be additionally increased by a load in the cabin fixture elements 2, as well as a force component in the vertical axis of the aircraft as it is generated, for example, during climbout. The bulging of the side walls 104 is clearly visible. In order to largely prevent this bulging, the force transmitting elements 106 are arranged at the locations, at which the most significant bulging occurs, namely above and below the center of gravity referred to the vertical axis of the aircraft. These force transmitting elements 106 are able to introduce the forces Q generated by the lateral sections 104 into the frame with at least one degree of freedom of motion.

Figure 3:
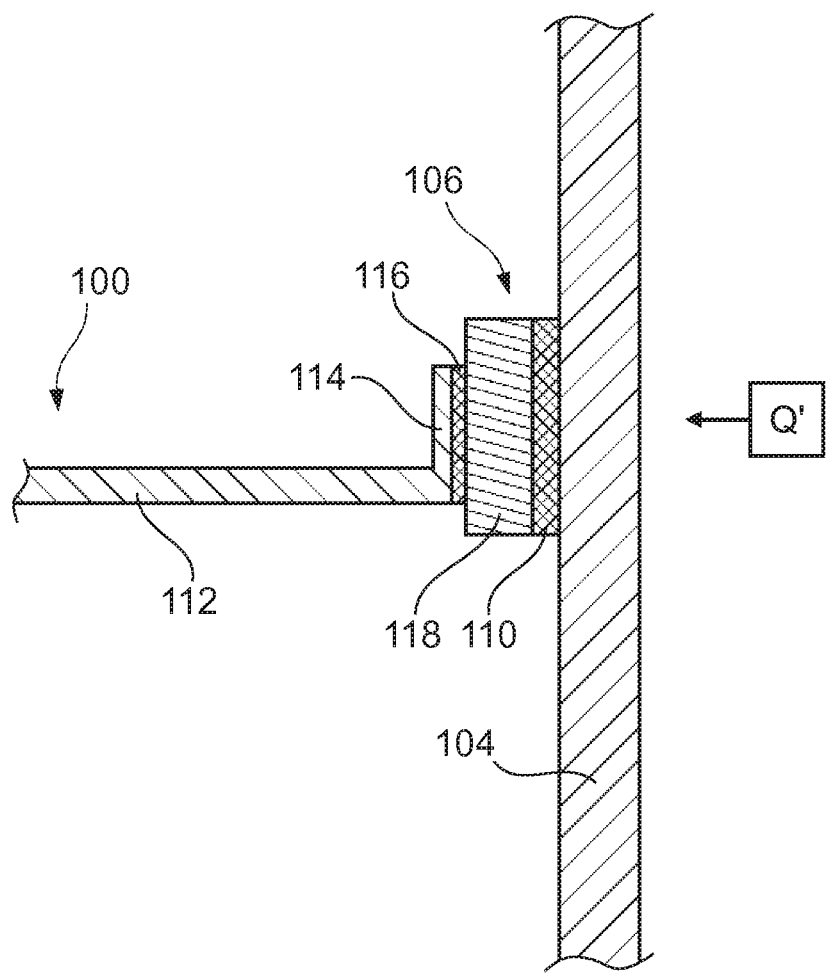
FIG. 3 shows a schematic representation of a force transmitting element.

FIG. 3 shows a schematic representation of the force transmitting element 106. In this case, a cabin bearing element 110 is inseparably connected to the side wall 104. In this figure, the frame 100 is realized in the form of a Z-frame, of which only part of the web 112 and one limb are visible. The limb simultaneously serves as structure bearing element 114. The surface that faces the lateral section 104 is provided with a friction-reducing insert 116 that is rigidly connected to the structure bearing element 114. This insert 116 may also be realized in the form of a coating. A spring damping element 118 is situated between the structure bearing element 114 or the insert 116, respectively, and the cabin bearing element 110 and realized in the form of a flat elastomer in this case. This spring damping element 118 is rigidly connected to the cabin bearing element 110. FIG. 3 furthermore shows the force Q that represents the component of the force Q acting upon the frame 100.

The side wall 104 introduces the force Q into the spring damping element 118 realized in the form of a flat elastomer with a progressive characteristic via the cabin bearing element 110. The force Q predominantly consists of the force Q that acts upon the frame 100 in the radial direction, but also has components that result from motions relative to the primary aircraft structure 5 that can be caused by vibrations and deformations during the operation of the aircraft. The spring damping element 118 dampens these components in order to ensure that they are not introduced into the frame 100. In addition, the insert 116 prevents adherence between the spring damping element 118 and the frame 100. Consequently, the spring damping element 118 only introduces forces into the frame 100 that the frame 100 is designed to absorb, namely purely radial forces. In addition, the force is introduced into the frame flatly due to the described design of the spring damping element 118. Local stress concentrations are prevented in this fashion.

Due to this design, the frame 100 is not subjected to forces that it is not designed to absorb. The introduction of such forces could lead to buckling of the frame 100 and therefore significantly weaken the primary aircraft structure 5

Figure 4:
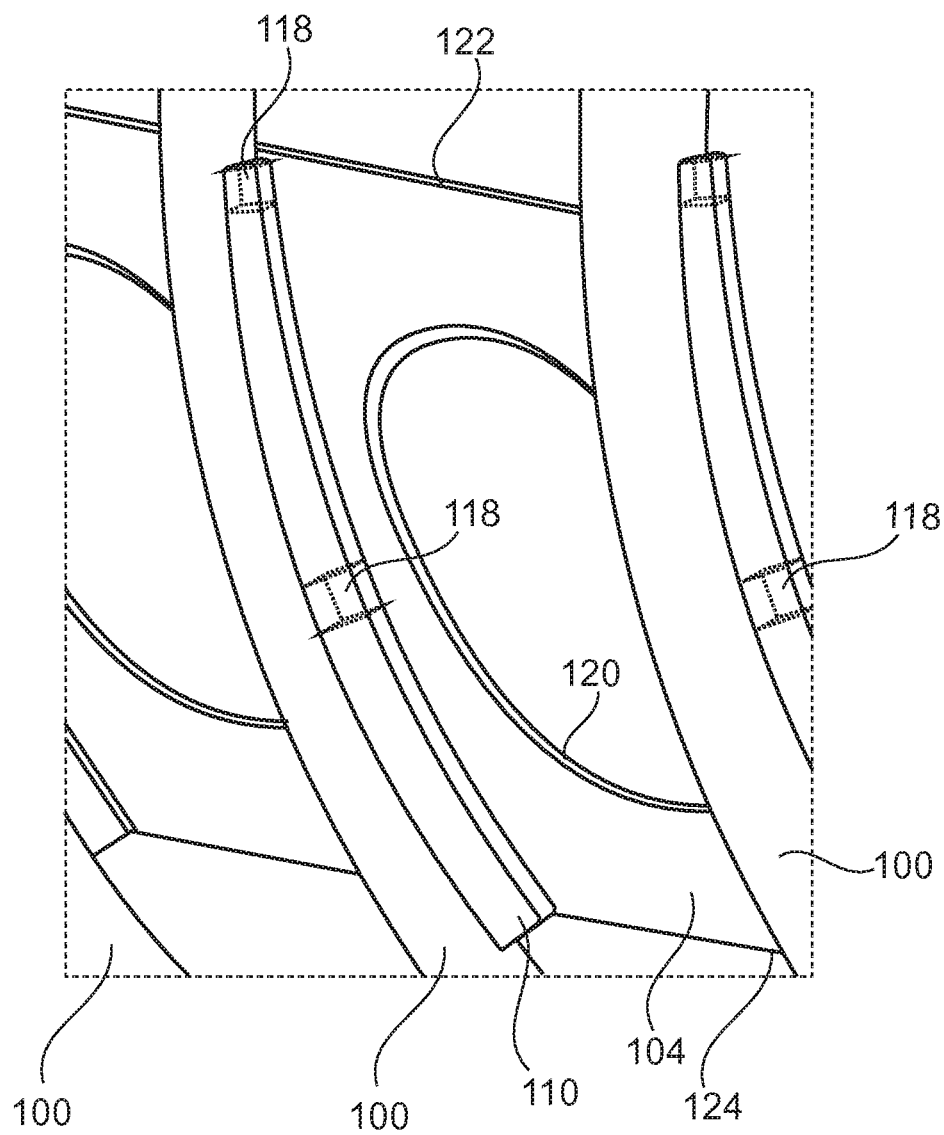
FIG. 4 shows a perspective representation of a lateral section with a continuous cabin bearing element.

FIG. 4 shows a perspective representation of a side wall 104 that is provided with window openings 120. This figure furthermore shows three frames 100, between which the window openings 120 are positioned. The side wall 104 has an upper end 122 and a lower end 124. One can clearly see that the lower end 124 is spaced apart from the frame 100 by a greater distance than the upper end 122. In order to allow the use of largely identical spring damping elements 118 for cost and inventory reasons, the cabin bearing element 110 that is rigidly connected to the side wall 104 is designed such that the distance between the structure bearing element 114 of the frame 100 and the cabin bearing element 110 is at least identical at the locations, at which the spring damping element 118 is installed. The cabin bearing element 110 is furthermore designed continuously between the upper end 122 and the lower end 124. This continuous design of the cabin bearing element 110 stiffens the side wall 104.

Figure 5:
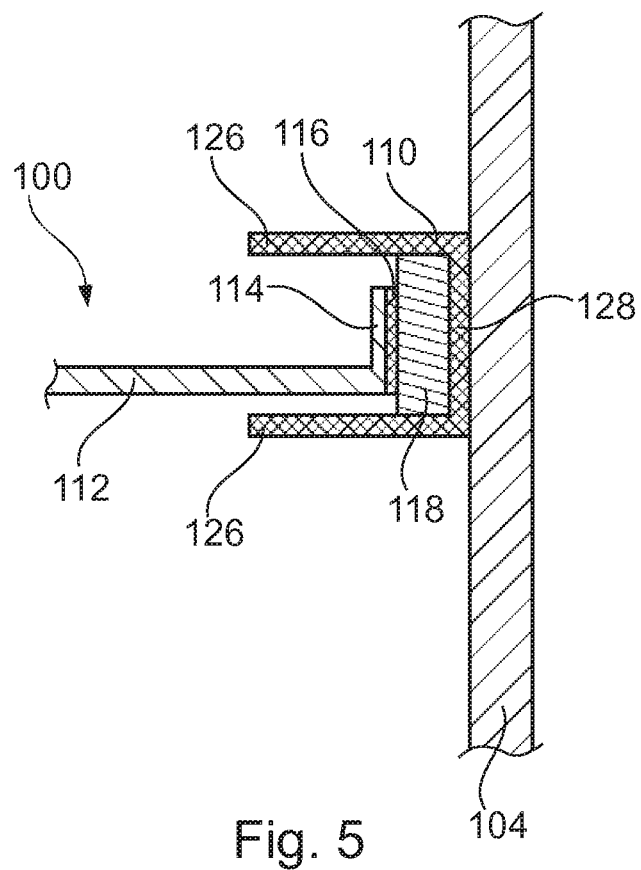
FIG. 5 shows a schematic representation of a cabin bearing element with stabilizing rib.

FIG. 5 shows a cross section through the arrangement described with reference to FIG. 4. The cabin bearing element is additionally expanded with two stabilizing ribs 126. The stabilizing ribs 126 are arranged in front of and behind the frame 100 referred to the longitudinal direction of the aircraft and rigidly connected to the cabin bearing element 110 in this case. Consequently, the cabin bearing element 110 is realized in a U-shaped fashion, wherein the stabilizing ribs 126 perpendicularly stand on the side wall 104 and point in the direction of the frame 100. The distance between the stabilizing ribs 126 needs to be so large that the stabilizing ribs 126 can under no circumstances come in contact with the frames 100 during flight operations because this would cause forces acting along the longitudinal axis of the aircraft to act upon the frames 100. This could lead to buckling of the frames 100 and therefore significant damages to the primary aircraft structure 5. The web 128 that connects the stabilizing ribs 126 may also be realized in the form of a hollow chamber profile, in which the hollow chamber itself may also be reinforced by means of webs. The stabilizing ribs 126 significantly stiffen the side walls 104. This makes it possible to realize the side walls with a weaker cross section and therefore with less materials and less weight.

Figure 6:
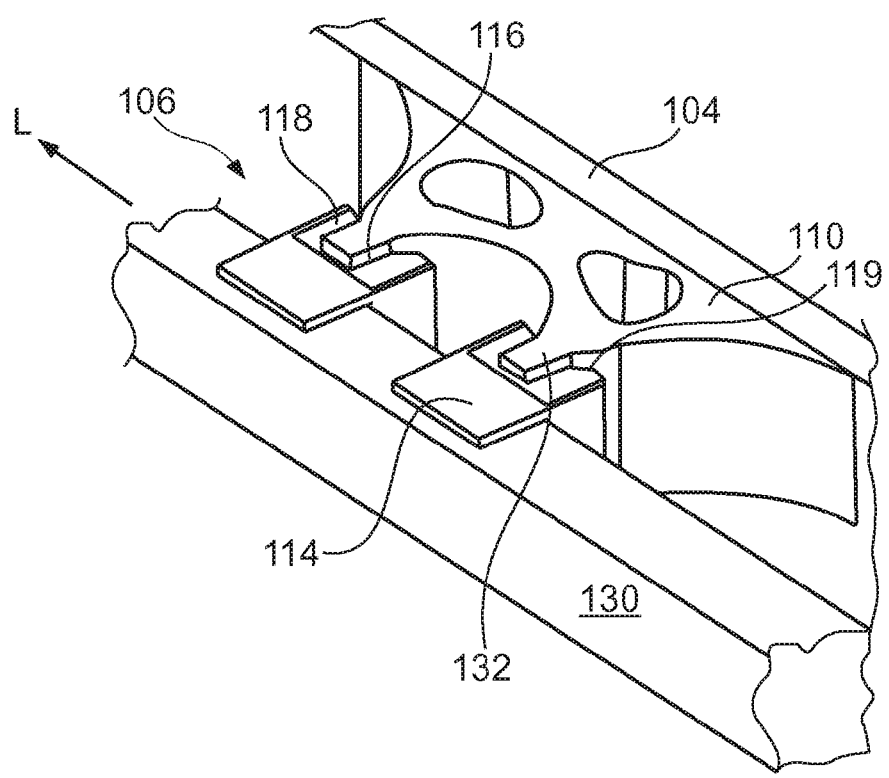
FIG. 6 shows a schematic representation of a force transmitting element that is arranged between a side wall and a stringer.

FIG. 6 schematically shows a force transmitting element 106 that is arranged between the side wall 104 and a stringer 130. The cabin bearing element 110 connected to the side wall 104 is realized in the form of a brace with two extensions 132, wherein the extension 132 has the contour of a cuboid. The extension 132 engages into a spring damping element 118 of U-shaped design in such a way that two opposite surfaces of the extension 132 contact the limbs of the spring damping element 118 without being connected thereto. These surfaces of the extension 132 are provided with a friction-reducing insert 116 that may also consist of a coating. In addition, the U-shaped spring damping element 118 features insertion bevels 119 on the ends that face away from the connecting web. The angle included by the two opposite limbs of the spring damping element 118 is smaller than 90° and amounts to 60° in the example shown. This U-shaped spring damping element 118 is rigidly connected to a U-shaped structure bearing element 114 in such a way that the limbs of the spring damping element 118 are congruent with the U-limbs of the structure bearing element 114. The structure bearing element 114 is rigidly connected to the stringer 130. In this case, the U-limbs of the structure bearing element 114 perpendicularly stand on the stringer 130, as well as perpendicular to the longitudinal axis of the aircraft.

A force generated by the side wall 104 is introduced into the structure bearing element 114 via the extension 132 of the cabin bearing element 110 and the spring damping element 118, wherein the structure bearing element in turn introduces the force into the stringer. Due to this arrangement, primarily the force component that extends along the longitudinal axis of the aircraft and is identified by the reference symbol L in the illustration can be introduced into the stringer. A rotational motion of the extension 132 can theoretically create another force component that is introduced into the stringer. However, this force component is, if it occurs at all, so small that it cannot cause damages to the stringer 132 due to buckling The spring damping element 106 therefore can only transmit forces with at least one degree of freedom of motion.

Figure 7:
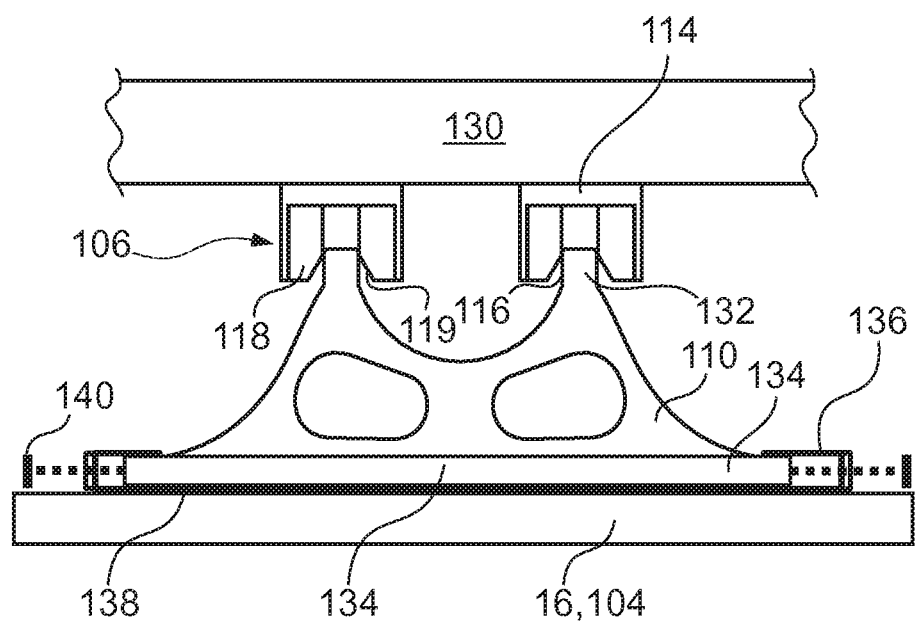
FIG. 7 shows a side will with an adjustable cabin bearing element.

FIG. 7 shows the cabin bearing element 110 that is arranged such that it can be adjusted relative to the side wall 104. For this purpose, the cabin bearing element 110 is rigidly connected to a sliding element 134. The sliding element 134 runs in a rail 136 that is rigidly connected to the side wall 104 or another cabin structure segment 16. A friction-reducing insert 138 is situated between the rail 136 and the sliding element 134. In order to adjust the sliding element 134 relative to the side wall 104 or the cabin structure segment 16, actuators 140 in the form of screws are arranged on the ends of the rail 136 and make it possible to respectively displace and fix the sliding element 134 or the cabin bearing element 110. The rail 126 is respectively aligned on the side wall 104 and on the cabin structure segment 16 such that it extends parallel to the stringer 130.

Due to manufacturing tolerances, it may occur that the cabin bearing element 110 described with reference to FIG. 6 does not engage into the structure bearing element 114 rigidly connected to the stringer 130 with its extension 132 during the installation of the cabin structure unit 1 on the aircraft structure 6, but that the two bearing elements 110, 114 rather are shifted relative to one another. Due to the adjustment option, the cabin bearing element 110 can be adjusted such that the two bearing elements 110, 114 engage into one another without any problems. An assembler can carry out this adjustment by reaching through a window opening in the fuselage. The insertion bevels 119 that were described above with reference to FIG. 6 and may be alternatively or additionally arranged on the extension 132 simplify the adjustment to the effect that the extensions 132 do not absolutely have to be positioned exactly in the region between the limbs of the U-shaped spring damping element 118 in order to insert the extensions 132 into the U-shaped spring damping element 118. The insertion bevels 119 also guide the extension 132 into the U-shaped spring damping element 118 if it is offset relative thereto such that an exact adjustment/positioning is simplified.

Figure 8:
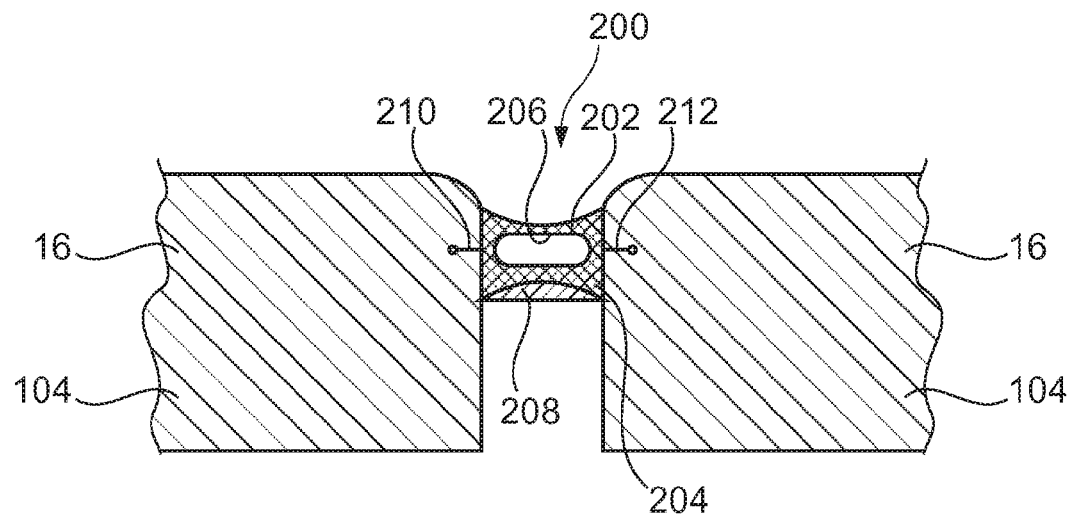
FIG. 8 shows a cross section through a sealing element that is not subjected to a load and connected to two cabin segments.

FIG. 8 shows a cross section through a sealing element 200 that is not subjected to a load. The sealing element 200 is arranged between two adjacent cabin segments 16 and closes a gap between these segments. The adjacent cabin segments 16 may form part of a common cabin structure unit 1. In this case, the gap normally extends parallel to the longitudinal axis of the aircraft. However, the adjacent cabin segments 16 may also form part of adjacent cabin structure units 1. In this case, the gap normally extends transverse to the longitudinal axis of the aircraft. The cabin segments 16 may also be realized in the form of side walls 104 that are arranged behind one another referred to the longitudinal axis of the aircraft. The sealing element 200 consists of two opposite longitudinal walls 202 that extend parallel to one another and two opposite lateral walls 204 that extend parallel to one another. The longitudinal walls 202 and the lateral walls 204 enclose a hollow chamber 206. The hollow chamber 206 is defined by a shape that resembles that of a rectangle, in which the narrow sides were replaced with a semicircle that points in the direction of the lateral walls 204. The hollow chamber 206 may be closed by means of vulcanizing, welding or bonding on its ends that are not visible in this figure. The outer sides of the longitudinal walls 202 look as if a segment of a circle 208 was removed from their originally rectangular cross section. In other words, the outer sides of the longitudinal walls 22 are concavely curved in the direction of the hollow chamber 206. Consequently, the material thickness continuously increases from the center of the longitudinal wall 22 toward the lateral walls 204. Each lateral wall 204 features a central spring 210 that engages into a groove 212 of the lateral section 104. Due to this symmetric arrangement of the sealing element 200, there is no preferred installation direction. The spring 210 and groove 212 arrangement is designed such that the lateral walls 204 abut on the side walls 104 in a plane fashion. The spring 210 also cannot be moved relative to the groove 212 under the influence of a force acting in the longitudinal direction of the sealing element 200. Consequently, it is ensured that no passages are formed during the operation of the aircraft, through which heat could escape from the passenger cabin or noises from outside could be transmitted into the passenger cabin. The hollow chamber 206 may also be filled with a gaseous, liquid or solid medium. The medium should be compressible such that the sealing element can fulfill its function. The medium naturally may also boost or entirely fulfill the functionality of the sealing element 200 with respect to heat insulation and noise reduction. It is also possible to adapt the entire sealing element 200 or only the outer sides of its longitudinal walls 202 to the interior of the passenger cabin with respect to its colors.

Figure 9:
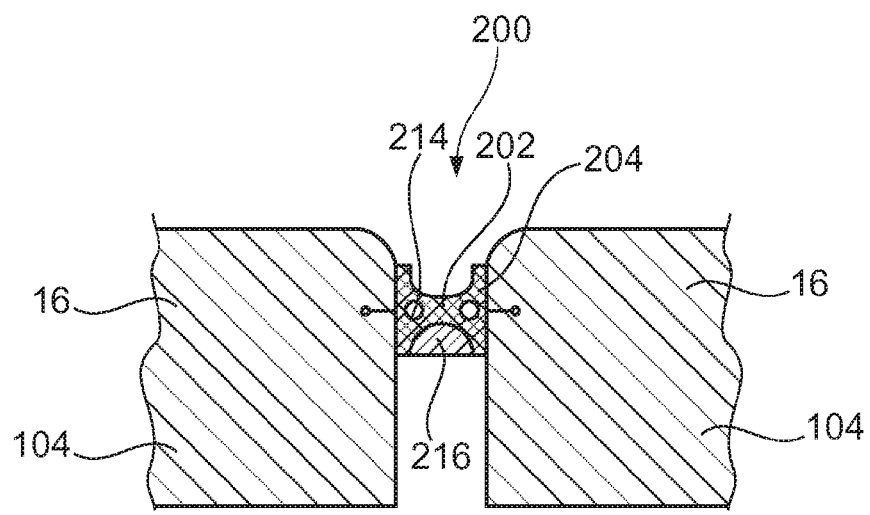
FIG. 9 shows a cross section through a sealing element that is subjected to a load in the form of longitudinal forces and connected to two cabin segments.

FIG. 9 shows a cross section through a sealing element 200 that is connected to two cabin segments 16 and subjected to forces occurring along the longitudinal axis of the aircraft. One can clearly see how the longitudinal walls 202 have moved toward one another due to the reduction of the gap and now contact one another in the center. This causes the hollow chamber 206 to be divided into two hollow chambers 214 that collectively have a smaller volume than the original hollow chamber 206. One can also clearly see that the height of the segment of a circle 216 has increased relative to the segment of a circle 208, i.e., that buckling of the longitudinal walls 202 has taken place. Once the longitudinal walls 202 contact one another, the force introduced into the sealing element 200 is no longer absorbed by the sealing element 200, but rather transmitted to the adjacent side wall 104. This changes the spring constant of the sealing element 200. This measure prevents the side walls 104 from contacting one another and therefore possible damages thereto.

Figure 10:
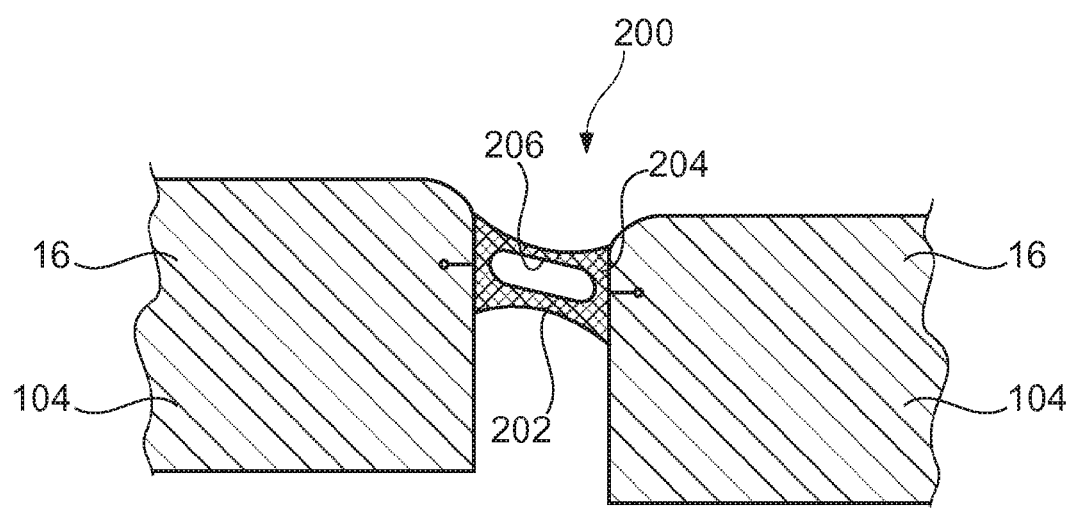
FIG. 10 shows a cross section through a sealing element that is subjected to a load in the form of transverse forces and connected to two cabin segments.

FIG. 10 shows a cross section through a sealing element 200 that is connected to two cabin segments 16 and subjected to forces occurring transverse to the longitudinal axis of the aircraft. This arrangement can be distinguished from the arrangement described with reference to FIG. 8 in that the side walls 104 are offset transverse to the longitudinal axis of the aircraft. One can clearly see that the design of the sealing element 200 causes the lateral walls 204 to abut on the cabin segments 16 in a plane fashion despite the offset.

FIGS. 11 and 12 show an exemplary embodiment of a cabin structure unit 1 with several cabin structure segments that are connected to one another by means of hinges. In this exemplary embodiment, each side of the cabin structure unit 1 is provided with a hinge 18 such that the cabin structure unit 1 can be collapsed as illustrated in FIG. 12. With reference to FIGS. 13 and 14, a cabin structure unit 1 may also feature a plurality of cabin structure segments 16, each of which is connected to the other cabin structure segment by means of a hinge. With reference to FIG. 12, small units of a cabin structure unit may already be positioned in the collapsed state.

Figure 17:
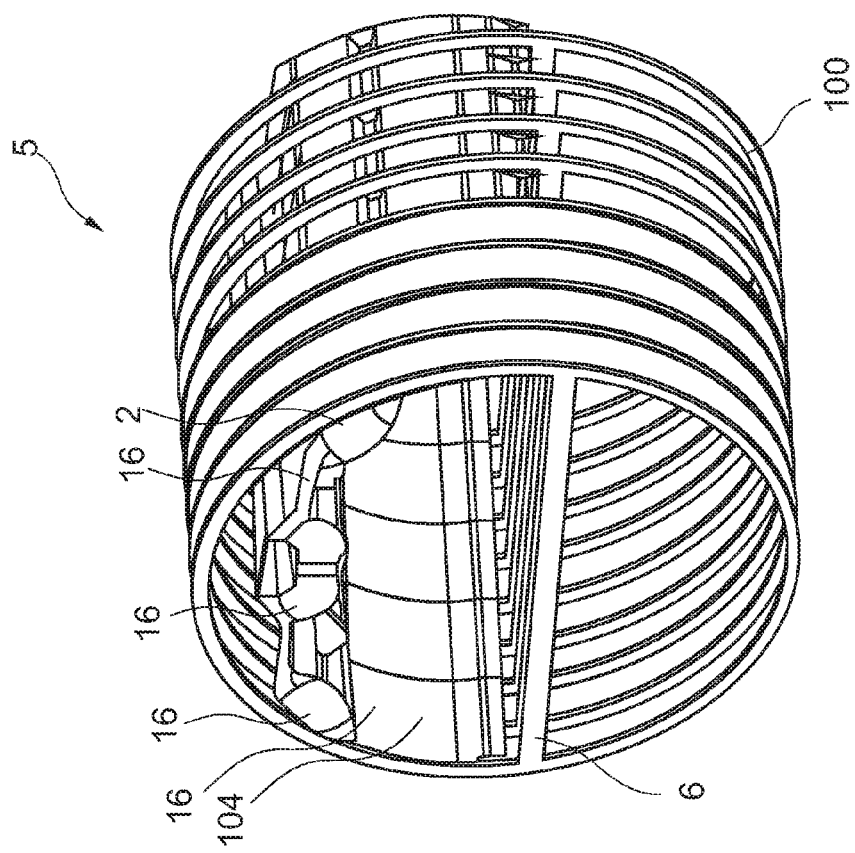
Figure 16:
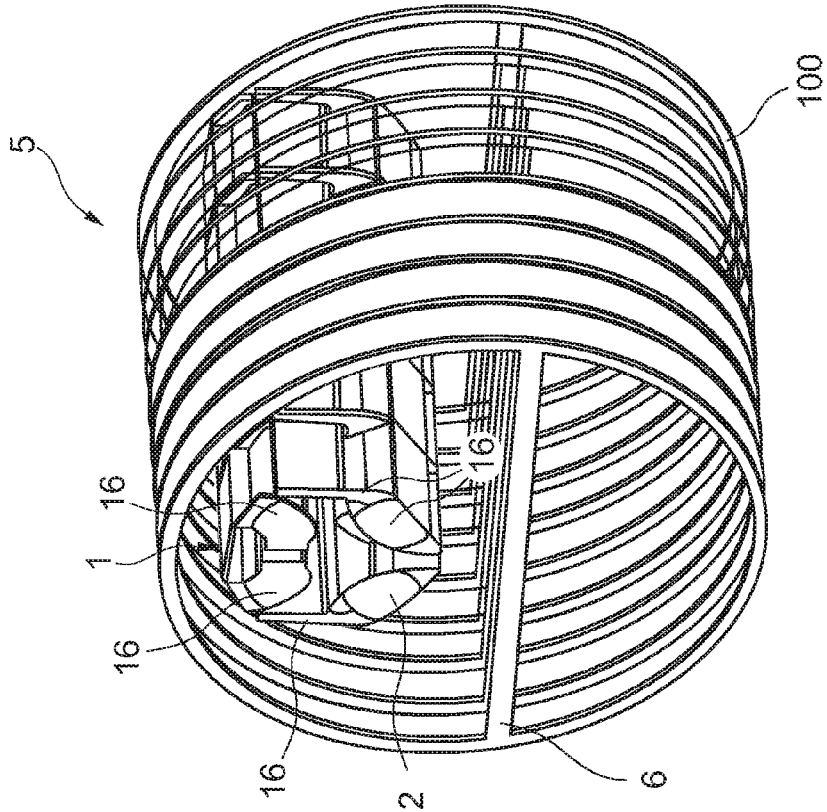

FIGS. 15 to 17 show one option for manufacturing a collapsible cabin structure unit. All cabin structure segments 16 can be installed before the cabin structure unit is transported into the fuselage segment. According to FIG. 15, the structure unit 1 and the cabin fixture element 2 may be preassembled outside the aircraft structure 5. The preassembled cabin structure unit 1 therefore has a small volume in the collapsed state. According to FIG. 16, the collapsed cabin structure unit 1 can be steered to the predetermined mounting position on the aircraft structure 5. After the predetermined mounting position on the aircraft structure 5 is reached, the cabin structure segment 16 is unfolded and mounted on the aircraft structure 5 as shown in FIG. 17. A simple and fast option for installing a cabin structure unit is provided in this way.

Figure 19:
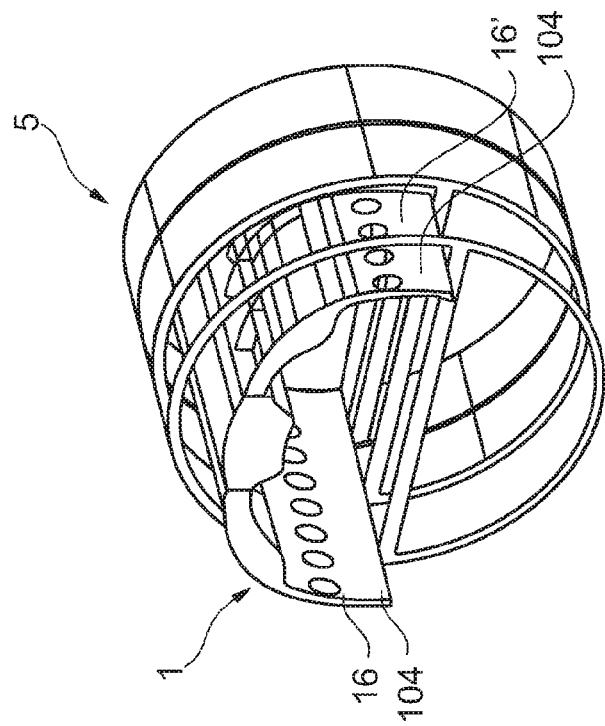
FIGS. 18 and 19 show schematic representations of a method for mounting a cabin structure unit that consists of several cabin structure segments according to one exemplary embodiment.
Figure 18:
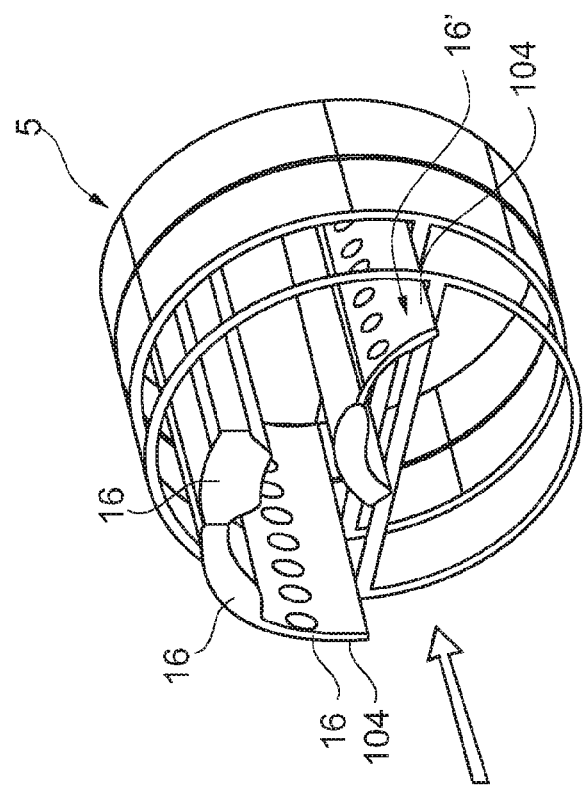

FIGS. 18 and 19 furthermore show an option for mounting the cabin structure unit 1 on an aircraft structure 5. The cabin structure unit 1 may also feature several cabin structure segments 16 that are separately transported to the predetermined position in the aircraft structure 5. Next, the cabin structure segments 16, 16" are connected to one another in order to produce the cabin structure unit 1. In this way, at least a few components of the cabin structure unit can be preassembled outside the aircraft such that the assembly sequence is accelerated.

Figure 20:
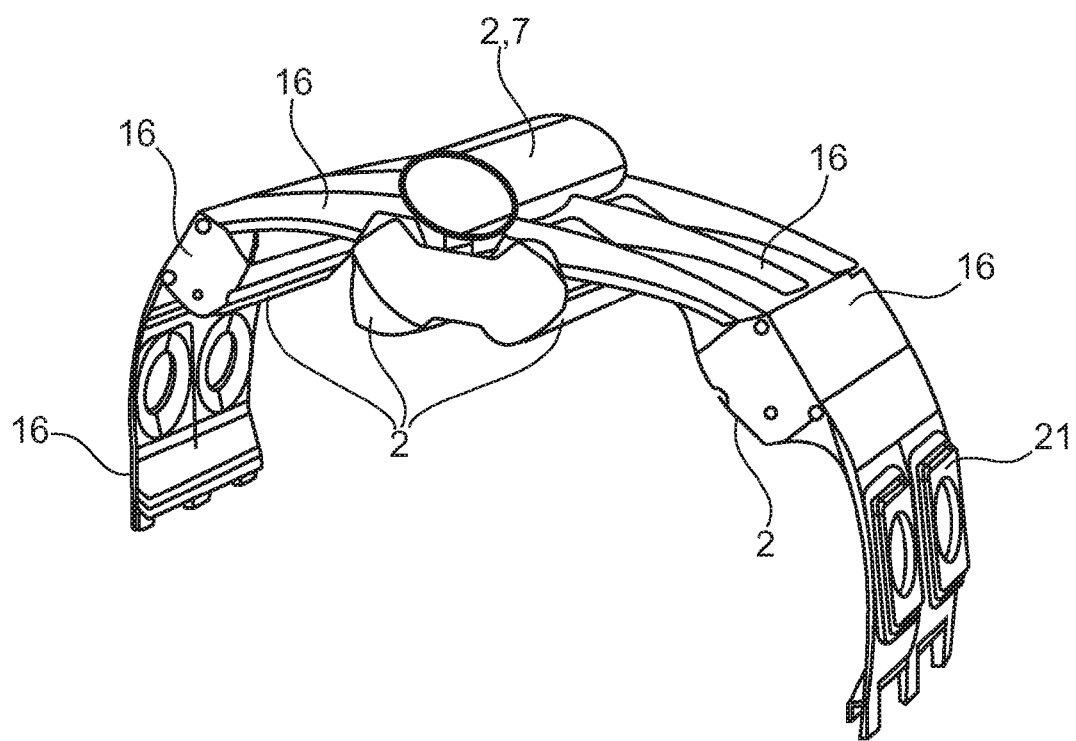
FIG. 20 shows a schematic representation of a cabin structure unit that contains several cabin fixture elements according to one exemplary embodiment.

FIG. 20 shows a schematic representation of a cabin structure unit 1 that consists of several cabin structure segments 16 and several cabin fixture elements 2. For example, cabin fixture elements 2 such as air ducts and luggage bins can be installed into the cabin structure unit 1 outside. Consequently, adaptation element 21 such as window adaptation units can be installed outside the aircraft structure. A prefabricated cabin structure unit that contains all functional elements such as cabin fixture elements 2, connecting elements 7 and adaptation elements 21 consequently can be preassembled outside the aircraft fuselage such that a faster and simpler installation can also be realized within the aircraft structure 5.

Figure 21:
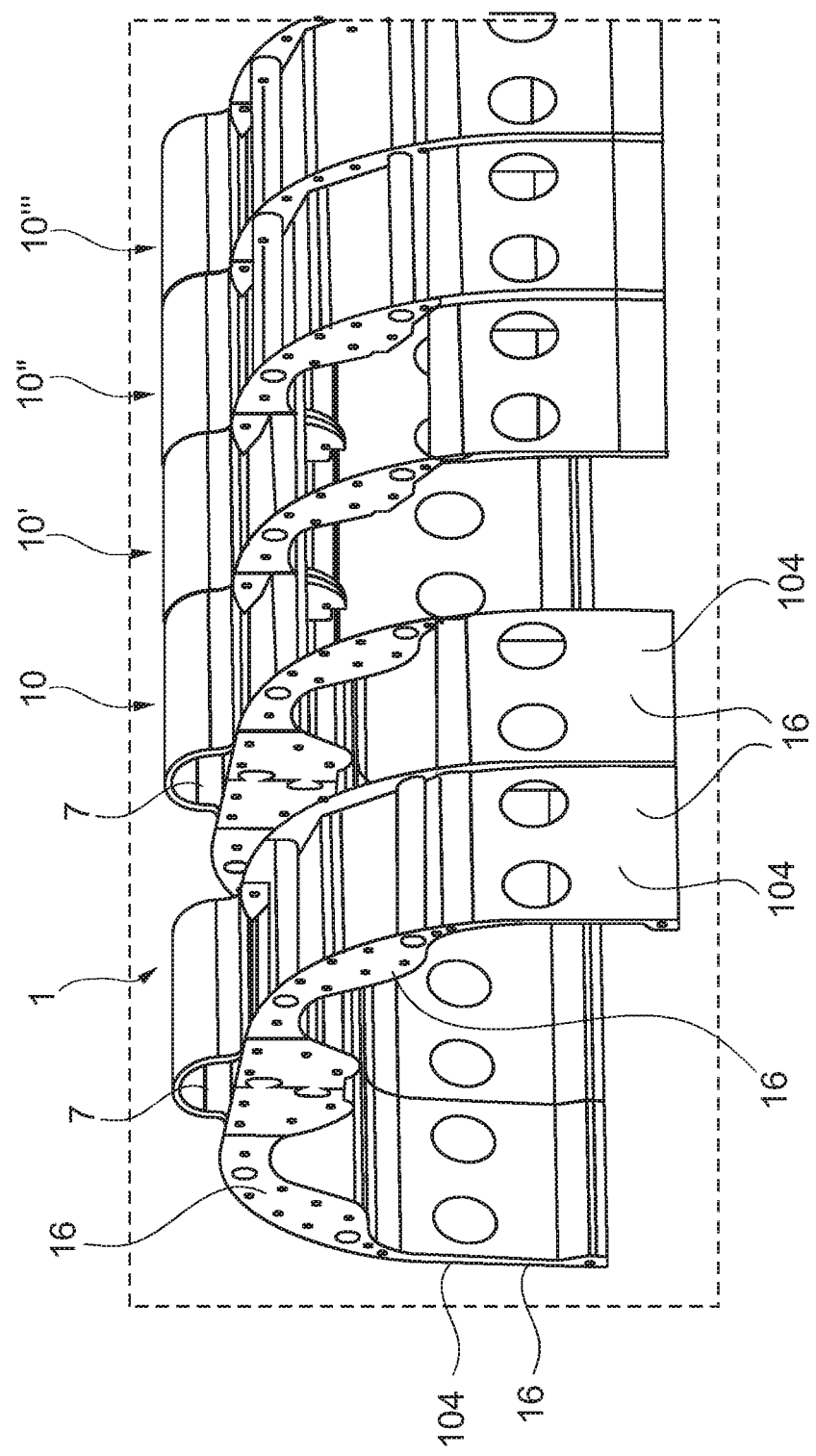
FIG. 21 shows a schematic representation with first and second cabin structure units that form a fuselage cabin according to one exemplary embodiment.

FIG. 21 shows an aircraft cabin that consists of several interconnected cabin structure units 1, 10, 10', 10", 10'". According to FIG. 21, the entire aircraft cabin may have a modular design with several cabin structure units 1, 10, 10', 10", 10'". Each cabin structure unit may be preassembled outside the aircraft and ultimately installed into the aircraft structure together with the cabin structure unit 10. Each cabin structure unit 1, 10 may consist, for example, of reinforcing screens 9, support frames 10, cabin structure segments 16 or connecting elements 7.

The cabin structure units 1, 10 can be easily mounted on one another by means of mounting elements. A compensation element 20 may be inserted between the cabin structure units in order to compensate motions of each individual cabin structure unit 1, 10. Each cabin structure unit 1, 10 may be designed in such a way that the compensation element 20 is not visible to the passengers. The gap between the cabin structure units 1, 10 can be reduced in comparison with conventional aircraft cabins due to the decoupling of the inner cabin structure units from the aircraft structure such that changes in the volume of the aircraft structure 5 due to pressure or temperature cannot have an influence on the inner cabin structure units 1, 10.

Figure 22:
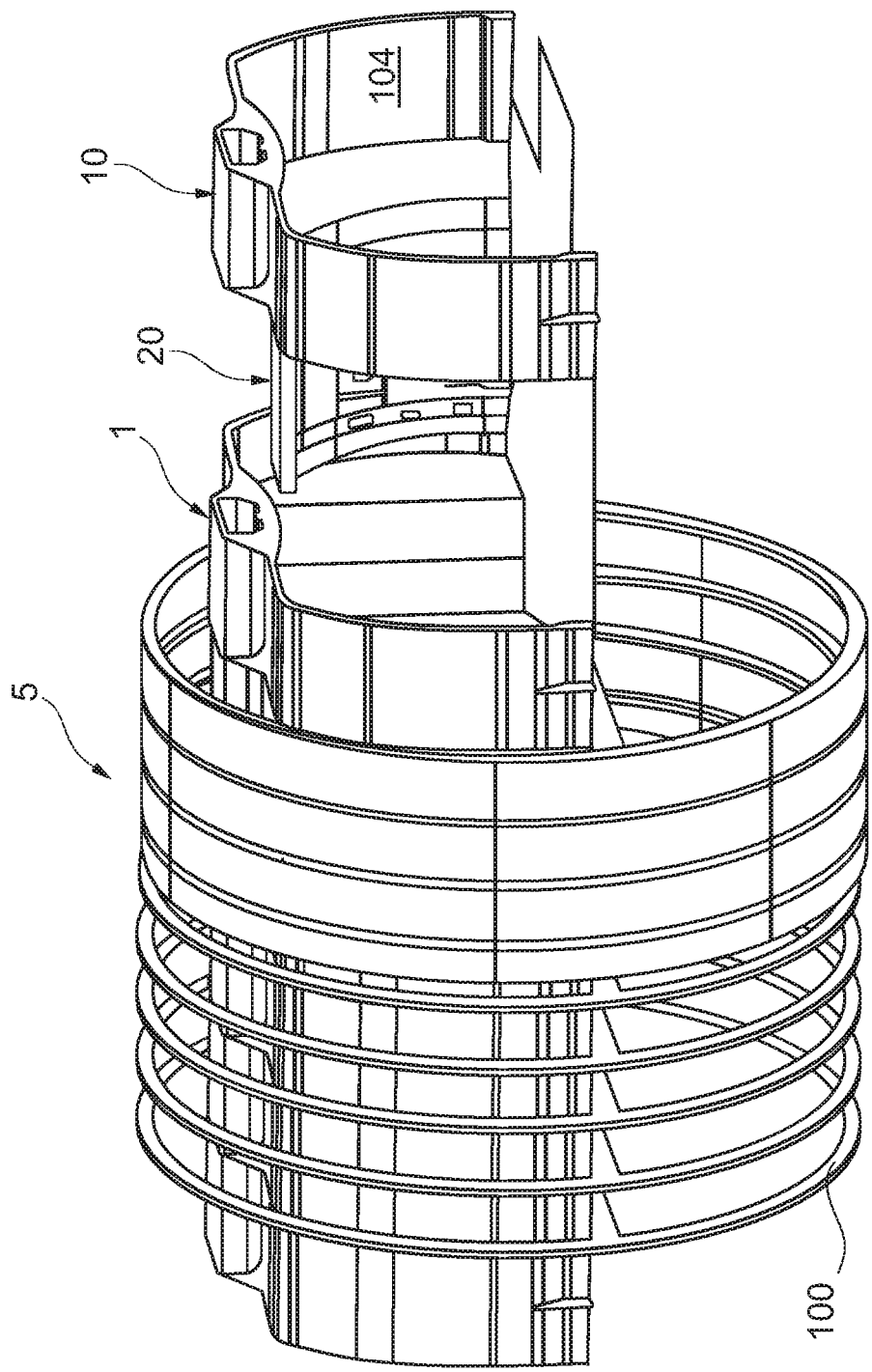
FIG. 22 shows a schematic representation of an aircraft fuselage with first and second cabin structure units that are connected by means of compensation elements according to one exemplary embodiment.

FIG. 22 shows an exemplary design of an aircraft fuselage that contains several cabin structure units 1, 10. The so-called door clearance line may also be used as compensation element 20 for compensating motions between each cabin structure units 1 and 10 in this case. Consequently, each cabin structure unit 1, 10 can move relative to the other cabin structure units without increasing the load acting upon on each cabin structure unit 1 due to these relative motions.

The cabin structure unit 1 may be arranged on the aircraft structure 5 by means of a movable bearing 3 or a fixed bearing 4. The cabin fixture elements 2 may also consist of monuments such as galleys, toilets or other functional units within a cabin. The cabin fixture elements 2 are integrated into the self-supporting cabin structure units 1, 10 and also decoupled from the aircraft structure 5. This is the reason why the cabin fixture elements 2 also move in the same direction and not in opposite directions in case of a deformation of the cabin structure unit 1. This makes it possible to lower the risk of damages that are caused by opposed motions of each cabin structure unit 1, particularly each cabin fixture element 2. The motion in the vertical direction according to the Z-axis can also be reduced by utilizing a combination of a movable bearing and a fixed bearing 3 and 4 such that only motions along the longitudinal direction of the fuselage can occur.

Figure 23:
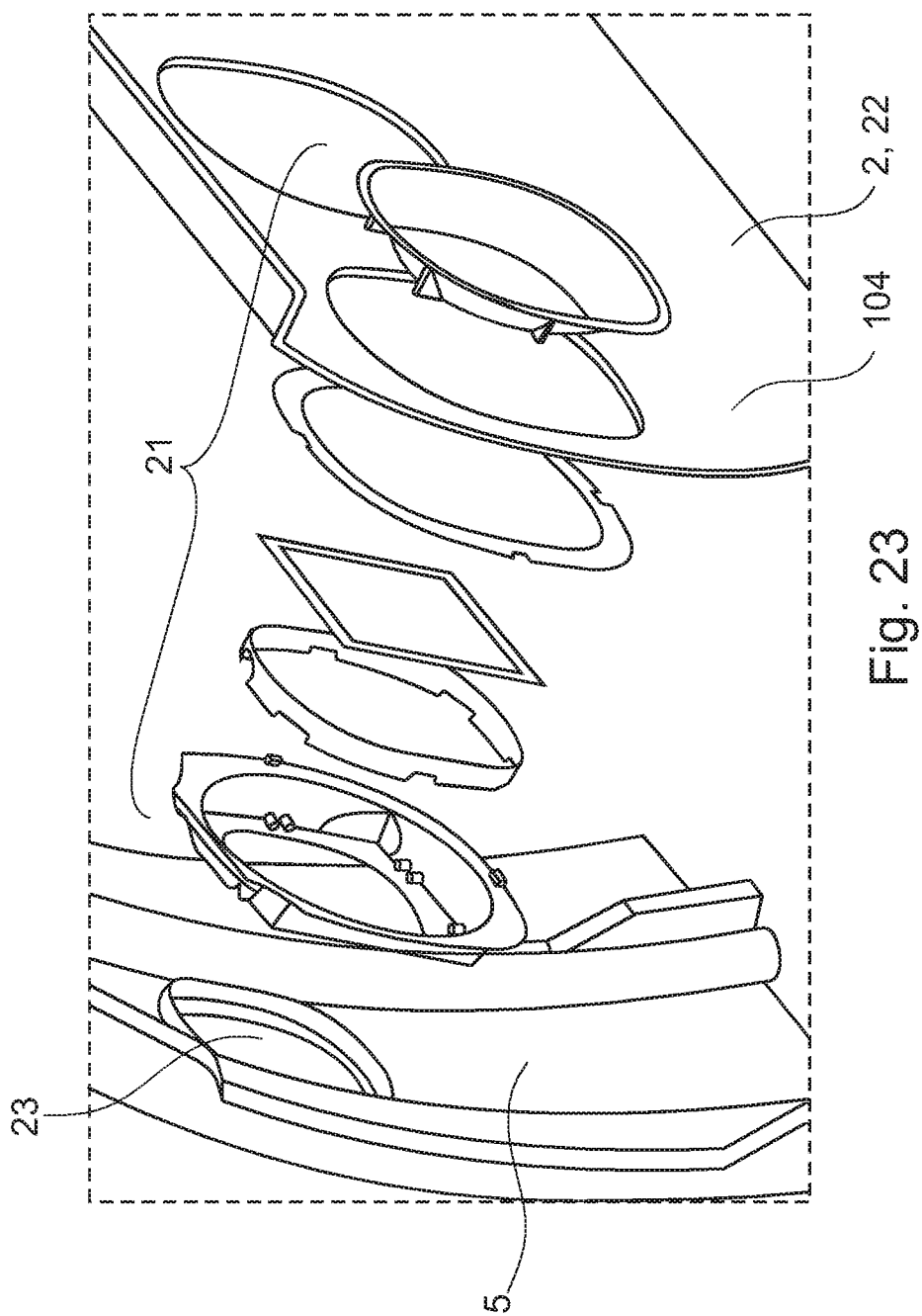
FIG. 23 shows a schematic representation of an adaptation element that connects cabin fixture elements to the aircraft structure according to one exemplary embodiment.

FIG. 23 shows a schematic representation of an adaptation element 21 that connects cabin fixture elements 2 of the cabin structure unit 1 to an aircraft structure 5. For example, air ducts need to be connected to the installations of the aircraft structure 5 just like window units. With respect to the window panel 2, 22, it is necessary to provide an adaptation element 21 for the window opening 23 of the aircraft structure 5. The adaptation element 21 produces a connection between the window panel 22 and the window opening 23. The adaptation element 21 may provide several components that may have sealing properties and flexible properties. The adaptation element 21 needs to be movable because relative motions between the aircraft structure and the cabin structure unit 1 can occur.

The adaptation element 21 may produce, for example, a plug and snap connection such that the cabin fixture elements 2 can be easily connected to the functional elements of the fuselage structure 5. The assembly time can be shortened due to the utilization of plug and snap connections for connecting the cabin fixture elements 2.

As a supplement, it should be noted that "comprising" or "featuring" does not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

LIST OF REFERENCE SYMBOLS

1 Cabin structure unit
2 Cabin fixture element, window panel
3 Movable bearing
4 Fixed bearing
5 Aircraft structure
6 Floor structure
7 Connecting element
9 Screen
10 Cabin structure unit, support frame
16 Cabin structure segment
18 Hinge
20 Compensation element
21 Adaptation element
22 Window panel
23 Window opening
100 Frame
102 Aircraft skin
104 Side wall
106 Force transmitting element
108 Original shape
110 Cabin bearing element
112 Web
114 Structure bearing element
116 Insert
118 Spring damping element
119 Insertion bevel
120 Window opening
122 Upper end of side wall
124 Lower end of side wall
126 Stabilizing rib
128 Web
130 Stringer
132 Extension
134 Sliding element
136 Rail
138 Friction-reducing coating
140 Actuator
200 Sealing element
202 Longitudinal wall
204 Lateral wall
206 Hollow chamber
208 Segment of a circle
210 Spring
212 Groove
214 Hollow chamber
216 Segment of a circle
G Force
Q Force
Q' Force
L Force

The invention claimed is:

1. An aircraft with a force transmitting element that separably connects a cabin structure segment (16) to a primary aircraft structure (5) and comprises a cabin bearing element (110), as well as a structure bearing element (114), wherein the cabin bearing element (110) is connected to the cabin structure segment (16) and the structure bearing element (114) is connected to the primary aircraft structure (5), wherein the force transmitting element (106) is designed in such a way that a force transmission between the cabin structure segment (16) and the primary aircraft structure (5) can take place with at least one degree of freedom of motion.

2. The aircraft of claim 1, wherein the primary aircraft structure (5) comprises frames (100) and stringers (130) that are designed for absorbing a force (Q', L) in one direction only, and wherein the force transmitting element (106) is arranged on frames (100) and/or stringers (130) and designed for transmitting the force (Q', L) in this direction only.

3. The aircraft of claim 1 or 2, wherein a friction-reducing insert (116) is situated between the structure bearing element (114) and the cabin bearing element (110).

4. The aircraft of one of claims 1 to 3, wherein a spring damping element (118) can be arranged between the structure bearing element (114) and the cabin bearing element (110).

5. The aircraft of claim 4, wherein the spring damping element (118) is either rigidly connected to the cabin bearing element (110) or the structure bearing element (114).

6. The aircraft of one of claims 1 to 5, wherein the cabin structure unit (1) respectively features one left and one right side wall (104) with an upper end (122) and a lower end (124), between which the cabin bearing element (110) extends in an at least partially continuous fashion and is rigidly connected to the side wall (104).

7. The aircraft of claim 6, wherein the lower end (124) of the side wall (104) is spaced apart from the primary aircraft structure (5) by a greater distance than the upper end (122), and wherein the cabin bearing element (110) is realized such that the distance of the cabin bearing element (110) from the structure bearing element (114) is essentially constant.

8. The aircraft of claim 6 or 7, wherein a stabilizing rib (126) is moulded onto the cabin bearing element (110).

9. The aircraft of one of claims 1 to 5, wherein the cabin bearing element (110) is realized in the form of a brace with an extension (132) that is rigidly connected to a sliding element (134).

10. The aircraft of claim 9, wherein the sliding element (134) is adjustably arranged in a rail (136) that is rigidly connected to the cabin structure segment (16; 104).

11. The aircraft of claim 10, wherein the rail is arranged in the direction, in which the force transmitting element can transmit a force.

12. An aircraft, particularly of one of claims 1 to 11, with a sealing element (200) for a cabin structure unit 1 featuring at least two cabin structure segments 16 that are spaced apart from one another by a gap, with the gap being at least partially closed with an elastic sealing element 200, wherein the sealing element 200 is realized in the form of a hollow chamber 206 defined by a pair of opposite longitudinal walls 202 that bridge the gap and a pair of opposite lateral walls 204 that abut on the cabin structure segments 16, wherein the pair of longitudinal walls 202 buckles toward one another in accordance with a predetermined spring constant when the gap becomes smaller, and wherein the spring constant changes when the pair of longitudinal walls 202 contact one another.

13. The aircraft of claim 12, wherein a medium is enclosed in the hollow chamber 206 of the sealing element 200.

14. The aircraft of claim 13, wherein the lateral wall 204 of the sealing element 200 features a spring 210 that engages into a groove 212 provided in the cabin structure segment 16 such that the position of the lateral wall 204 is fixed relative to the cabin structure segment 16.

15. A cabin structure unit for mounting cabin fixture elements in an aircraft, particularly an aircraft of one of claims 1 to 14,
wherein the cabin structure unit (1) is designed in such a way that a cabin fixture element (2) can be mounted;
wherein the cabin structure unit (1) is realized in a self-supporting fashion;
wherein the cabin structure unit (1) can be mounted on an aircraft structure (5; 6);
wherein the cabin structure unit (1) features cabin structure segments (16); and
wherein the cabin structure segments (16) are connected to one another in a collapsible fashion by means of hinges.

16. The cabin structure unit of claim 15,
wherein the cabin structure unit (1) furthermore features adaptation elements (21); and
wherein the adaptation elements (21) are designed for connecting the cabin fixture elements (2) to the aircraft structure (5) or to the floor structure (6).

* * * * *